United States Patent
Diatzikis et al.

(10) Patent No.: US 7,002,791 B2
(45) Date of Patent: Feb. 21, 2006

(54) SYSTEM, METHOD, AND APPARATUS FOR CONFIGURING CARD SUPPORT BRACKET TO CONFORM TO MULTIPLE PROFILES

(75) Inventors: George O. Diatzikis, Apex, NC (US); Jennifer Lynn Greenwood, Durham, NC (US); James Stephen Rutledge, Durham, NC (US); Brian J. Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 135 days.

(21) Appl. No.: 10/659,844

(22) Filed: Sep. 10, 2003

(65) Prior Publication Data

US 2005/0052829 A1 Mar. 10, 2005

(51) Int. Cl.
*H05K 5/00* (2006.01)
(52) U.S. Cl. ....................... 361/679; 361/683
(58) Field of Classification Search ................. 361/679, 361/683–686, 756, 802
See application file for complete search history.

(56) References Cited

U.S. PATENT DOCUMENTS

| 4,873,395 | A  | * | 10/1989 | Mast ...................... 174/35 GC |
| 6,402,111 | B1 |   | 6/2002  | Stewart et al. |
| 6,412,749 | B1 |   | 7/2002  | Supinski et al. |
| 6,708,830 | B1 | * | 3/2004  | Mendoza ...................... 211/26 |

* cited by examiner

*Primary Examiner*—Yean-Hsi Chang
(74) *Attorney, Agent, or Firm*—Scott W. Reid; Dillon & Yudell LLP

(57) ABSTRACT

A system, method, and apparatus for configuring an electronics card support bracket to adaptably and readily conform to more than one computer system profile is disclosed. The bracket fits in both full height and low profile mechanical configurations. The design includes a hinged bracket that swings back from the full height configuration to the low profile configuration. The bracket hinge is placed so that a swing back portion of the bracket provides a required edge lip on one end of the bracket.

14 Claims, 6 Drawing Sheets

SYSTEM, METHOD, AND APPARATUS FOR CONFIGURING CARD SUPPORT BRACKET TO CONFORM TO MULTIPLE PROFILES

BACKGROUND OF THE INVENTION

1. Technical Field

The present invention relates in general to an improved bracket design for a computer system and, in particular, to an improved system, method, and apparatus for configuring an electronics card support bracket to adaptably conform to more than one computer system profile.

2. Description of the Related Art

Most computer systems are equipped to be reconfigured with different electronic components should the need arise. For example, some computer systems may be configured with either an accelerated graphics port (AGP) or a peripheral component interconnect (PCI) card solution. AGP provides enhanced video performance by moving video off of the PCI bus and allowing the video subsystem to make use of standard system memory. The AGP interface is a platform bus specification that enables high performance graphics capabilities. By moving graphics off of the PCI bus, AGP gives that bus more bandwidth for other I/O functions such as audio and communication access. AGP neither replaces nor diminishes the necessity of PCI in the system, and is physically, logically, and electrically independent of the PCI bus. AGP is not a bus because it is not shared by anything but the graphics controller. It is intended for the exclusive use of visual display devices such that other I/O devices remain on the PCI bus.

Reconfiguring a computer system with different electronic components such as AGP/PCI sometimes requires different mechanical structures in order to share compatibility and support the system change. In the case of the AGP and PCI card solutions, there are full height and low profile configurations of each adapter. A different support bracket is required for each type of card (full height or low profile). These brackets differ in size and form factor and therefore require two different versions of the card to be supplied. This creates two part numbers for every one card solution since parts that are otherwise identical cannot be changed "on the fly" in stage one manufacturing. Although this design is workable, an improved system and method that eliminates the need to have different versions of the card would be desirable.

SUMMARY OF THE INVENTION

One embodiment of a system, method, and apparatus for configuring an electronics card support bracket to adaptably and readily conform to more than one computer system profile is disclosed. The present invention solves the problem of requiring different brackets and assemblies for different systems by providing a single bracket that can be quickly adapted for each system. The single bracket is designed to fit in both full height and low profile mechanical configurations. This solution works by utilizing a hinged bracket that swings back from the full height configuration to the low profile configuration. The bracket hinge is placed so that a swing back portion of the bracket provides a required edge lip on one end of the bracket. The edge lip of the swing back portion is only partially cut through the bracket metal in order to avoid forming a hole in the back end of the system.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 3:
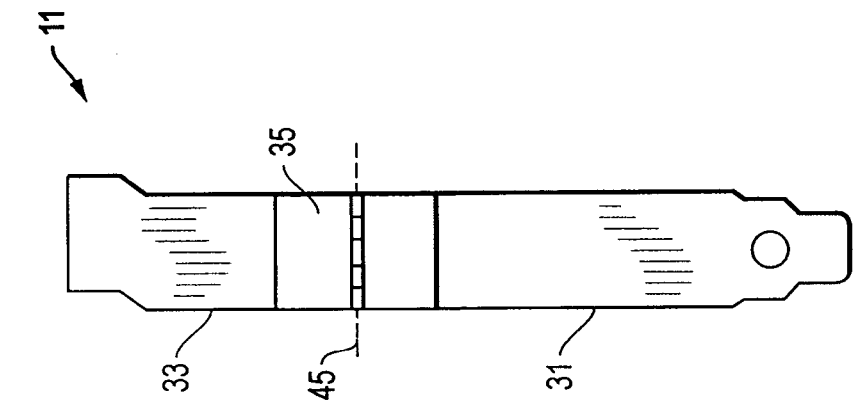
FIG. 3 is a rear view of the bracket of FIG. 1.
Figure 2:
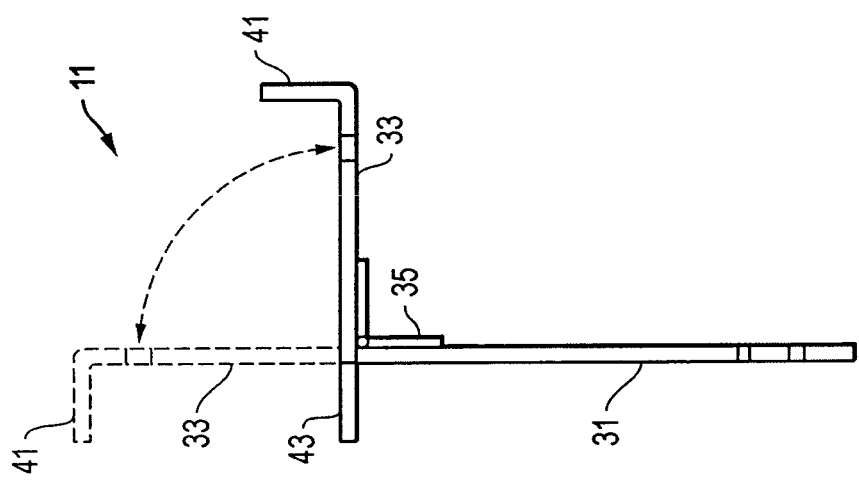
FIG. 2 is a side view of the bracket of FIG. 1 illustrating multiple configurations thereof.
Figure 1:
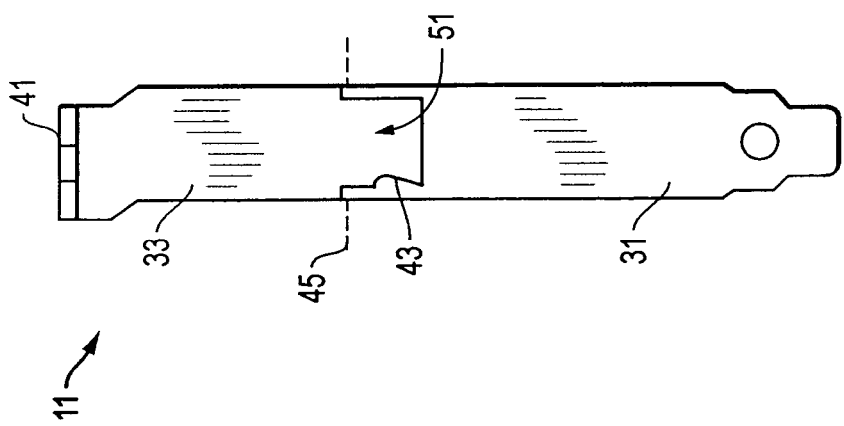
FIG. 1 is a front view of one embodiment of a bracket constructed in accordance with the present invention.
Figure 4:
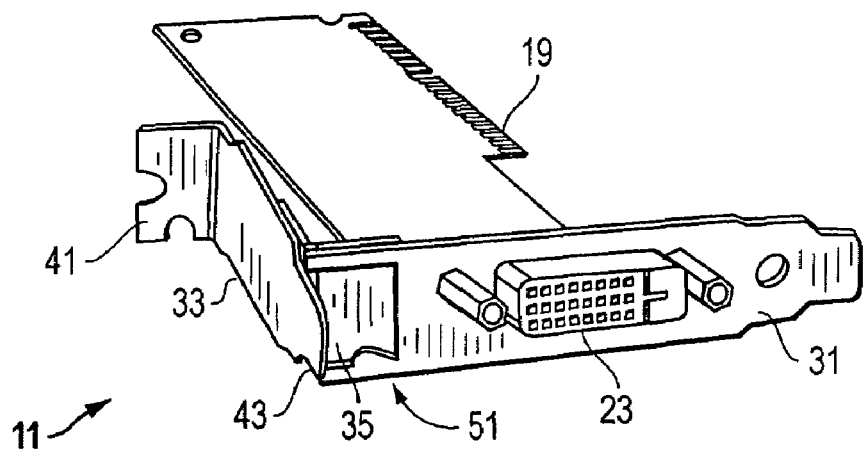
FIG. 4 is a front isometric view of the bracket of FIG. 1 in a retracted position and attached to an electronics card.
Figure 5:
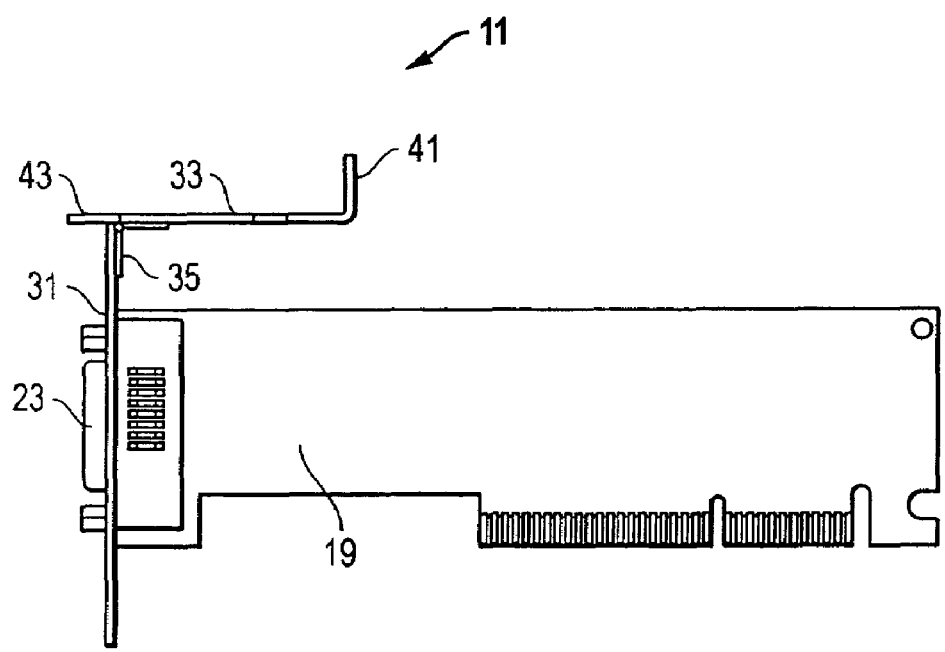
FIG. 5 is a side view of the bracket and electronics card assembly of FIG. 4.

Referring to FIGS. 1–3, one embodiment of an apparatus or bracket 11 is shown. The bracket 11 is part of a system and method for configuring a product, such as a computer system 13 (FIGS. 6–10). The computer system 13 includes an enclosure 15 having an aperture 17 that is configurable in either a first configuration or a second configuration, the first and second configurations having first and second form factors, respectively. In the embodiment shown, the first configuration supports a low profile AGP card 19 (FIG. 7) and the second configuration supports a full height AGP card 21 (FIG. 10). A connector 23 for the cards 19, 21 is mounted to and protrudes through an opening in the bracket 11. The computer system 13 also has a plurality of electrical components mounted to the enclosure 15 for performing computational functions in response to commands as is known in the art.

The bracket 11 is mounted to the enclosure 15 for covering the aperture 17. The bracket 11 has a base portion 31 and a movable portion 33 that is movable relative to the base portion 31. The movable portion 33 is movable between an extended position (FIGS. 1, 3, and 8–10) such that the bracket 11 is configured to cover the aperture 17 in the second form factor (i.e., for the full-height AGP card 19). The movable portion 33 also has a retracted position (FIGS. 4–7) such that the bracket 11 is configured to cover the aperture 17 in the first form factor (i.e., for the low profile AGP card 21). Although only the two types of AGP cards are illustrated, one skilled in the art will appreciate that the same bracket 11 can be attached to both types of PCI cards (i.e., low profile and full height) as well. In the extended position, the movable portion 33 is coplanar with the base portion 31. In the retracted position, the movable portion 33 is out of plane with respect to the base portion 31. In the embodiment shown, the movable portion is substantially perpendicular to the base portion 31 while in the retracted position.

Figure 6:
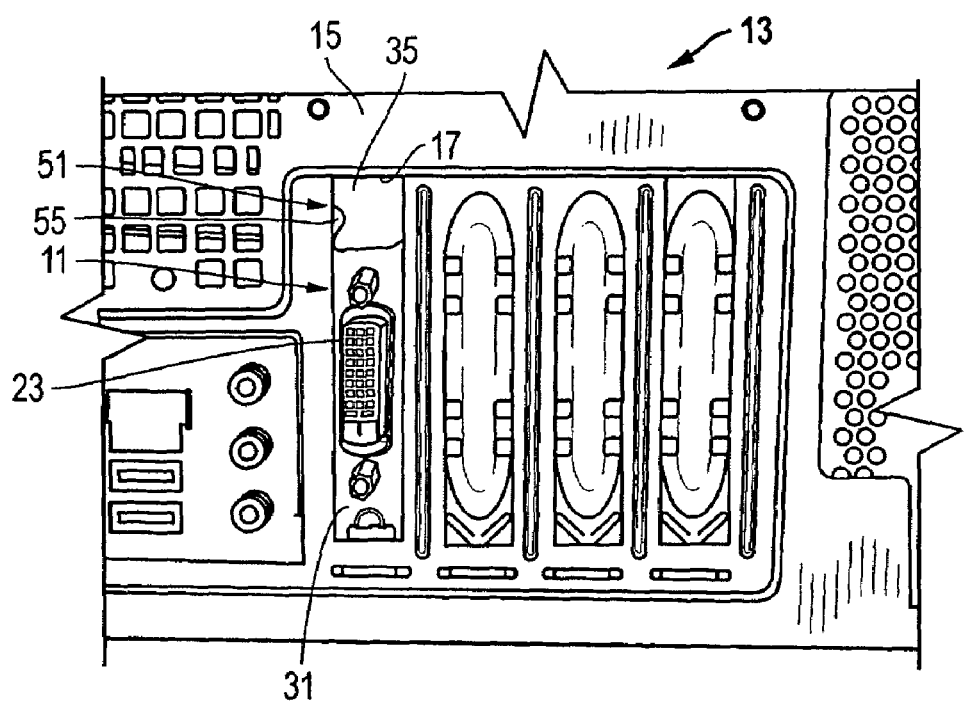
FIG. 6 is a front view of the bracket and electronics card assembly of FIGS. 4 and 5 installed in a computer system and constructed in accordance with the present invention.
Figure 7:
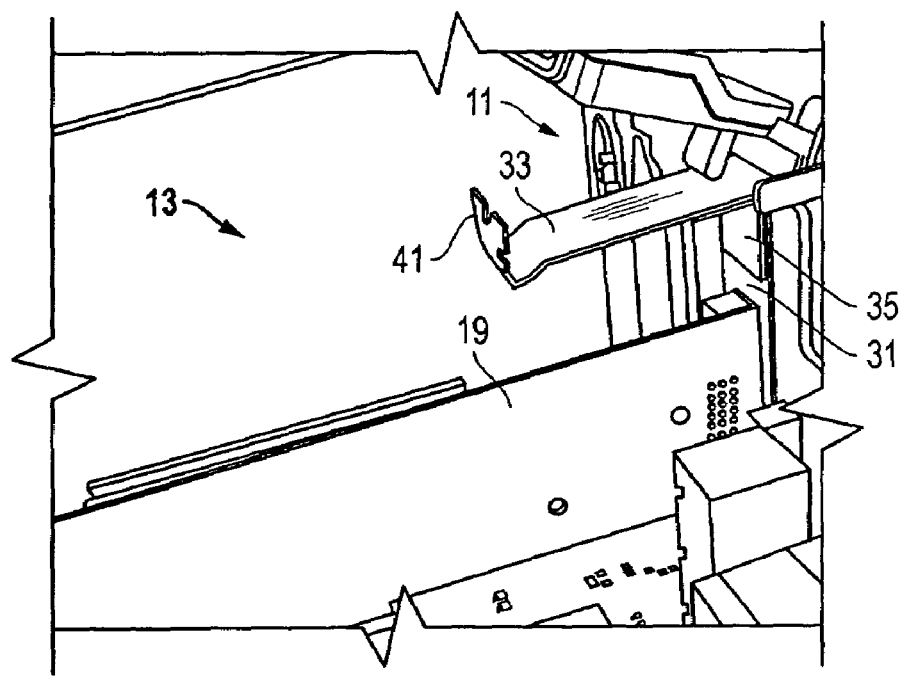
FIG. 7 is a rear isometric view of the bracket, electronics card, and computer system assembly of FIG. 6.
Figure 9:
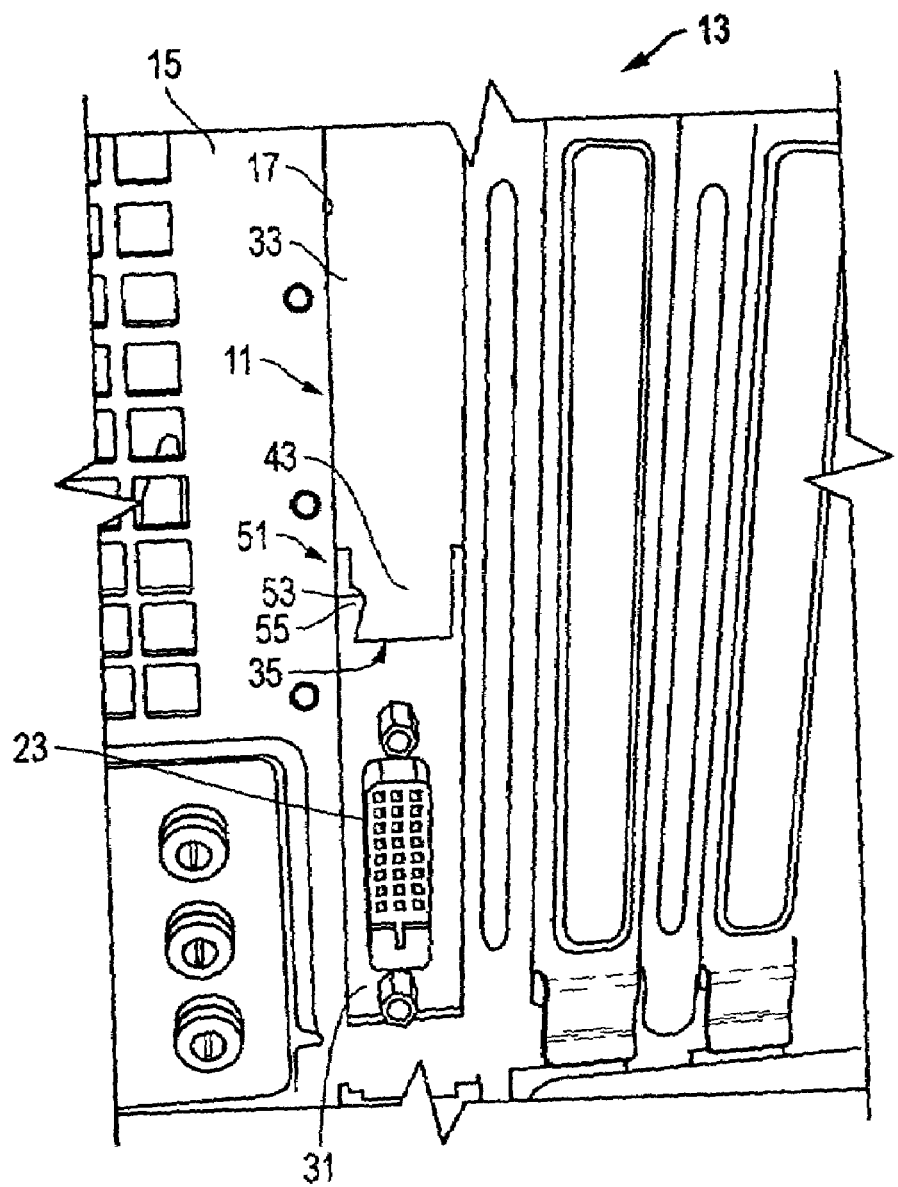
FIG. 9 is a front view of the bracket and electronics card assembly of FIG. 8 installed in a computer system and constructed in accordance with the present invention.
Figure 10:
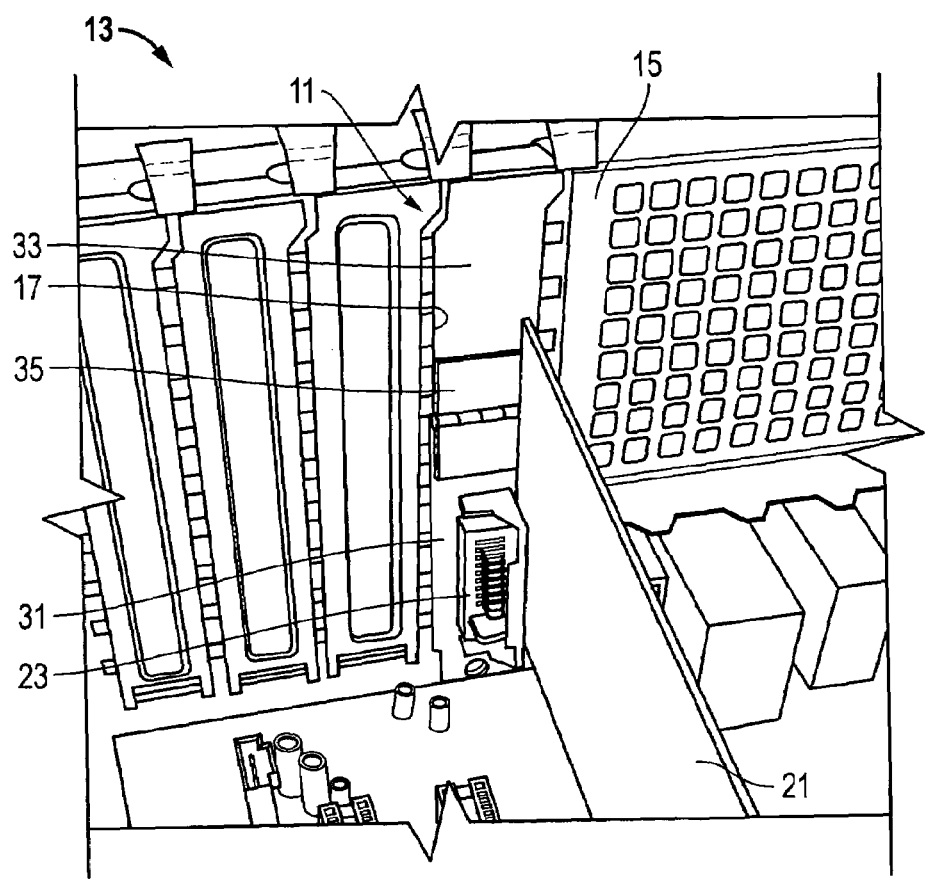
FIG. 10 is a rear isometric view of the bracket, electronics card, and computer system assembly of FIG. 9.
Figure 8:
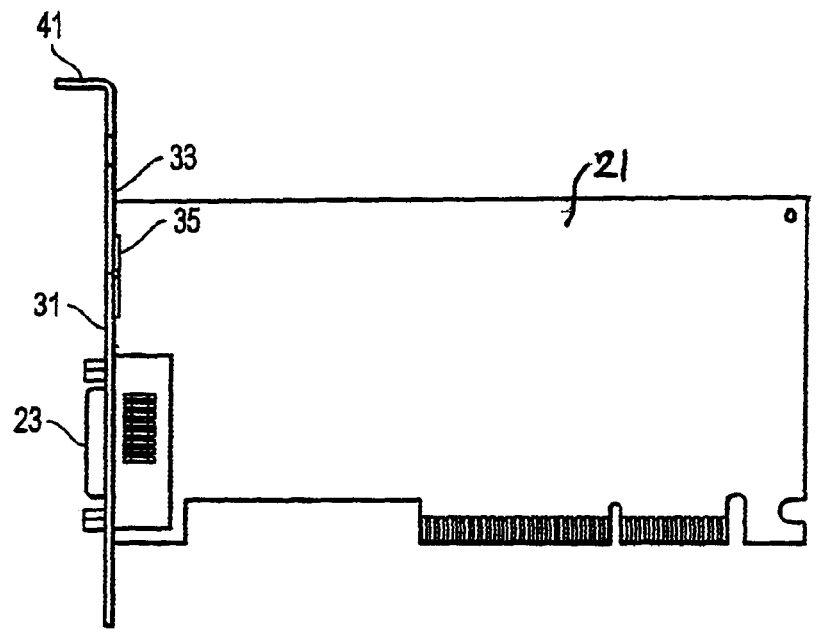

In the first configuration, both the base portion 31 and the movable portion 33 cover the aperture 17, as shown in FIGS. 9 and 10. In the second configuration, the movable portion 33 does not cover the aperture 17, as shown in FIG. 6. A hinge 35 (FIGS. 2 and 3) is mounted to the base portion 31 and the movable portion 33 for enabling movement of the movable portion 33 between the extended and retracted positions. In the second configuration, the hinge 35 partially covers the aperture 17, as shown in FIG. 6.

The bracket 11 also has a first flange 41 on one end of the movable portion 33. An opposite end of the movable portion 33 forms a second flange 43 for the base portion 31 when the movable portion 33 is in the retracted position. In addition, a pivot axis 45 (FIGS. 1 and 3) of the hinge 35 is located between the first flange 41 and the opposite end or second flange 43. The bracket 11 further comprises a retention feature 51 (FIGS. 1 and 9) for retaining the movable portion 33 in either the extended position or the retracted position. In the embodiment shown, the retention feature 51 comprises a recess 53 on the movable portion 33 that is engaged by a protrusion 55 on the base portion 31.

In operation, the present invention also comprises a method of assembling components, such as those described above. Initially, the method comprises providing a product, such as the computer system 13, with an aperture 17 that is configurable in either a first configuration or a second configuration. The first and second configurations having different form factors, and preferably comprise configuring the aperture 17 and the bracket 11, respectively, to support either the low profile AGP card 19 or the full height AGP card 21. The method also comprises configuring the aperture 17 of the product (e.g., computer 13) in one of the first and second configurations.

The bracket 11 is also configured to match the configuration selected in the previous step, or whenever the aperture 17 is configured, such that the bracket 11 has the form factor as the product. This step comprises positioning the movable portion 33 of the bracket 11 relative to a base portion 31 of the bracket 11. For the retracted position, this means folding the movable portion 33 relative to the base portion 31. This step includes positioning the movable portion 33 in a co-planar position relative to the base portion 31 in the first configuration and, in the second position, positioning the movable portion 33 out of plane with respect to the base portion 31. In addition, this step may comprise retaining the movable portion 33 in either the first or second configuration with a retention feature 51. The final step comprises mounting the configured bracket 11 to the product such that the aperture 17 is covered by the configured bracket 11.

The present invention has several advantages, including the ability to configure an electronics card support bracket to adaptably and readily conform to more than one computer system profile. The present invention solves the problem of requiring different brackets and assemblies for different systems by providing a single bracket that can be quickly adapted for each system. The single bracket is designed to fit in both full height and low profile mechanical configurations. This solution works by utilizing a hinged bracket that swings back from the full height configuration to the low profile configuration. The bracket hinge is placed so that a swing back portion of the bracket provides a required edge lip on one end of the bracket. The edge lip of the swing back portion is only partially cut through the bracket metal in order to avoid forming a hole in the back end of the system.

While the invention has been shown or described in only some of its forms, it should be apparent to those skilled in the art that it is not so limited, but is susceptible to various changes without departing from the scope of the invention. For example, although the present invention has been shown and/or described only for the two types of AGP cards, the bracket is equally suited for both types of PCI cards (i.e., low profile and full height) as well.

What is claimed is:

1. A method of assembling components, comprising:
    (a) providing a product having an aperture that is configurable in either a first configuration or a second configuration, the first and second configurations having different form factors;
    (b) configuring the aperture of the product in one of the first and second configurations;
    (c) configuring a bracket to match the configuration selected in step (b) such that the bracket has a same form factor as the product, wherein
        step (c) comprises retaining the movable portion in either said one of the first and second configurations with a retention feature,
        steps (b) and (c) comprise configuring the aperture and the bracket, respectively, to support either a low profile electronics card or a full height electronics card,
        step (c) comprises positioning a movable portion of the bracket relative to a base portion of the bracket,
        step (c) comprises folding the movable portion relative to the base portion, and
        step (c) comprises positioning the movable portion in a co-planar position relative to the base portion in the first configuration and, in the second position, positioning the movable portion out of plane with respect to the base portion;
    (d) mounting the configured bracket to the product such that the aperture is covered by the configured bracket; and
    (e) providing a retention feature on the bracket for retaining the movable portion in either the extended position or the retracted position.

2. A system for configuring a product, comprising:
    an enclosure having an aperture that is configurable in either a first configuration or a second configuration, the first and second configurations having first and second form factors, respectively;
    a plurality of electrical components mounted to the enclosure for performing computational functions in response to commands; and
    a bracket mounted to the enclosure for covering the aperture, the bracket having a base portion and a movable portion that is movable relative to the base portion between an extended position such that the bracket is configured to cover the aperture in the second form factor, and a retracted position such that the bracket is configured to cover the aperture in the first form factor.

3. The system of claim 2, wherein the first configuration supports a low profile electronics card and the second configuration supports a full height electronics card.

4. The system of claim 2, wherein, in the extended position, the movable portion is co-planar with the base portion and, in the retracted position, the movable portion is out of plane with respect to the base portion.

5. The system of claim 2, wherein, in the second configuration, both the base portion and the movable portion cover the aperture, and, in the first configuration, the movable portion does not cover the aperture.

6. The system of claim 2, further comprising a hinge mounted to the base portion and the movable portion for enabling movement of the movable portion between the extended and retracted positions.

7. The system of claim 6, wherein, in the second configuration, the hinge partially covers the aperture.

8. The system of claim 2, further comprising a first flange on one end of the movable portion, and wherein an opposite end of the movable portion forms a second flange for the base portion when the movable portion is in the retracted position.

9. The system of claim 8, further comprising a hinge for enabling movement of the movable portion between the extended and retracted positions, and wherein a pivot axis of the hinge is located between the first flange and the opposite end.

10. The system of claim 2, further comprising a retention feature on the bracket for retaining the movable portion in either the extended position or the retracted position.

11. The system of claim 10, wherein the retention feature comprises a recess on the movable portion that is engaged by a protrusion on the base portion.

12. A bracket, comprising:
a base portion;
a movable portion that is movable relative to the base portion between an extended position such that the bracket is configured in a first form factor, and a retracted position such that the bracket is configured in a second form factor;
a hinge mounted to the base portion and the movable portion for moving the movable portion between the extended and retracted positions, wherein a pivot axis of the hinge is located between the first flange and the opposite end;
a first flange on one end of the movable portion, and an opposite end of the movable portion forms a second flange for the base portion when the movable portion is in the retracted position; and a retention feature on the bracket for retaining the movable portion in either the extended position or the retracted position;
wherein in the extended position, the movable portion is co-planar with the base portion and, in the retracted position, the movable portion is out of plane with respect to the base portion.

13. The bracket of claim 12, wherein the retention feature comprises a recess on the movable portion that is engaged by a protrusion on the base portion.

14. The bracket of claim 13, wherein the retraction feature comprises a recess on the moveable portion that is engaged by a protrusion on the base portion.

* * * * *

UNITED STATES PATENT AND TRADEMARK OFFICE
CERTIFICATE OF CORRECTION

PATENT NO. : 7,002,791 B2  Page 1 of 2
APPLICATION NO. : 10/659844
DATED : February 21, 2006
INVENTOR(S) : Dlatzikis et al.

Figure 8:
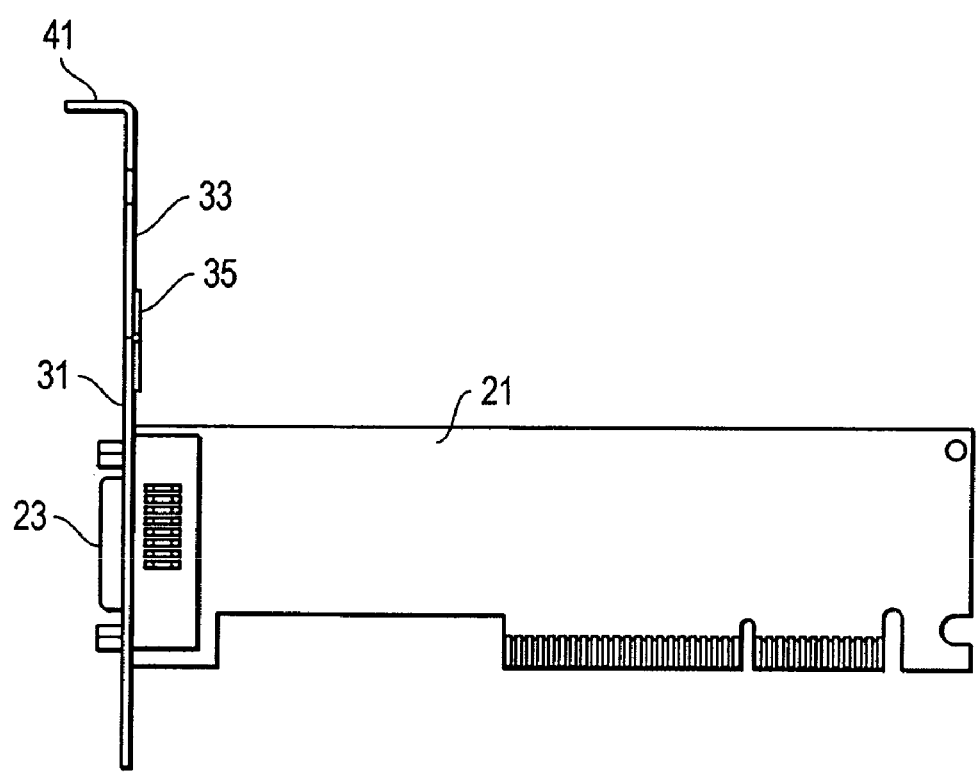
FIG. 8 is a side view of the bracket of FIG. 1 in an extended position and attached to the electronics card.

It is certified that error appears in the above-identified patent and that said Letters Patent is hereby corrected as shown below:

At sheet 4 of 6, delete "FIG. 8 [drawing]" and insert

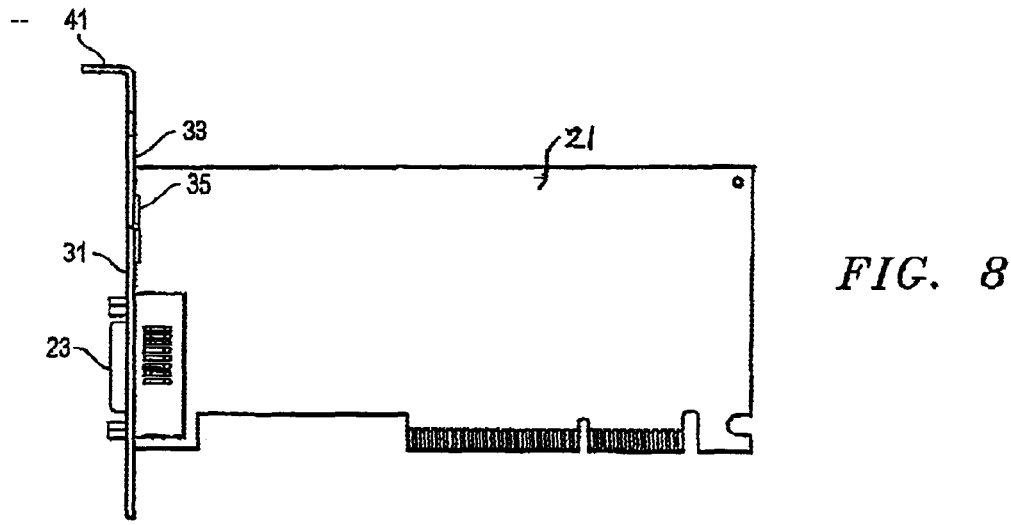

as per the replacement sheet provided in Amendment A. (see attached sheet)

Signed and Sealed this

Twenty-fourth Day of October, 2006

JON W. DUDAS
*Director of the United States Patent and Trademark Office*